(12) United States Patent
Kneuper et al.

(10) Patent No.: US 10,899,460 B2
(45) Date of Patent: Jan. 26, 2021

(54) SYSTEM AND METHOD FOR IMPROVED PILOT SITUATIONAL AWARENESS

(71) Applicant: THE BOEING COMPANY, Chicago, IL (US)

(72) Inventors: Nils Kneuper, Bergkamen (DE); Ralf Rene Shu-Zhong Cabos, Lower Saxony (DE)

(73) Assignee: THE BOEING COMPANY, Chicago, IL (US)

( * ) Notice: Subject to any disclaimer, the term of this patent is extended or adjusted under 35 U.S.C. 154(b) by 189 days.

(21) Appl. No.: 16/025,513

(22) Filed: Jul. 2, 2018

(65) Prior Publication Data

US 2020/0002011 A1 Jan. 2, 2020

(51) Int. Cl.
| | |
|---|---|
| *B64D 15/20* | (2006.01) |
| *B64D 43/02* | (2006.01) |
| *G01P 15/08* | (2006.01) |
| *G01P 21/02* | (2006.01) |
| *G01P 5/16* | (2006.01) |
| *G01P 5/165* | (2006.01) |
| *G01W 1/00* | (2006.01) |

(52) U.S. Cl.
CPC ............ *B64D 15/20* (2013.01); *B64D 43/02* (2013.01); *G01P 5/165* (2013.01); *G01P 15/0802* (2013.01); *G01W 1/00* (2013.01)

(58) Field of Classification Search
CPC ..... B64D 15/20; B64D 43/02; G01P 15/0802; G01P 5/165; G01P 21/025; G01P 7/00; G01P 5/16; G01W 1/00
USPC .......................................................... 701/14
See application file for complete search history.

(56) References Cited

U.S. PATENT DOCUMENTS

| | | | |
|---|---|---|---|
| 7,398,182 B2 * | 7/2008 | Petit ...................... | B64D 15/20 244/75.1 |
| 9,914,543 B2 | 3/2018 | Meis et al. | |
| 2005/0043865 A1 * | 2/2005 | Seve ....................... | G01P 5/16 701/7 |
| 2009/0321576 A1 * | 12/2009 | Shah ...................... | B64D 15/20 244/134 F |
| 2011/0031353 A1 * | 2/2011 | Stolte .................... | B64D 15/04 244/207 |
| 2015/0027226 A1 * | 1/2015 | Turon .................... | G01C 19/56 73/504.04 |

(Continued)

*Primary Examiner* — Behrang Badii
*Assistant Examiner* — Hossam M Abd El Latif
(74) *Attorney, Agent, or Firm* — Moore IP Law

(57) ABSTRACT

A method includes determining a first speed value based on a first signal from a first data source. The method also includes determining a second speed value based on a second signal from a second data source. The method further includes determining a first likelihood of icing value based on a third signal from a third data source. The method also includes determining a second likelihood of icing value based on a fourth signal from a fourth data source. The method further includes performing a first comparison between the first speed value and the second speed value and performing a second comparison between the first likelihood of icing value and the second likelihood of icing value. The method also includes generating sensor reliability data based on the first comparison and the second comparison and displaying situational awareness data based on the sensor reliability data.

20 Claims, 6 Drawing Sheets

(56) References Cited

U.S. PATENT DOCUMENTS

2017/0166314 A1* 6/2017 Meis ................... B64D 15/22
2019/0367178 A1* 12/2019 Matayoshi .............. G01S 17/58

* cited by examiner

SYSTEM AND METHOD FOR IMPROVED PILOT SITUATIONAL AWARENESS

FIELD OF THE DISCLOSURE

The present disclosure is related to providing pilots with improved situational awareness.

BACKGROUND

An aircraft includes a plurality of sensors that are used to provide a pilot with information related to the aircraft. As non-limiting examples, the aircraft can include pressure sensors, temperatures sensors, force sensors, torque sensors, speed sensors, flow sensors, etc. Each sensor has its limitations, such as a range of operational conditions over which the sensor can provide reliable data. Due to the complexity of various sensor systems and the pilot focus required to fly the aircraft, circumstances can arise in which a sensor is operating under conditions that are outside its typical operational range without the pilot being aware of this situation.

SUMMARY

According to one implementation of the present disclosure, an aircraft includes a controller configured to determine, for a first time, a first speed value based on a first signal from a first data source. The controller is also configured to determine, for the first time, a second speed value based on a second signal from a second data source. The controller is further configured to determine, for the first time, a first likelihood of icing value based on a third signal from a third data source. The controller is also configured to determine, for the first time, a second likelihood of icing value based on a fourth signal from a fourth data source. The controller is further configured to perform a first comparison between the first speed value and the second speed value and perform a second comparison between the first likelihood of icing value and the second likelihood of icing value. The controller is also configured to generate sensor reliability data based on the first comparison and the second comparison. The aircraft also includes a display screen coupled to the controller. The display screen is configured to display situational awareness data based on the sensor reliability data.

According to another implementation of the present disclosure, a method includes determining, for a first time at a controller, a first speed value based on a first signal from a first data source. The method also includes determining, for the first time, a second speed value based on a second signal from a second data source. The method further includes determining, for the first time, a first likelihood of icing value based on a third signal from a third data source. The method also includes determining, for the first time, a second likelihood of icing value based on a fourth signal from a fourth data source. The method further includes performing a first comparison between the first speed value and the second speed value and performing a second comparison between the first likelihood of icing value and the second likelihood of icing value. The method also includes generating sensor reliability data based on the first comparison and the second comparison and displaying situational awareness data based on the sensor reliability data.

According to another implementation of the present disclosure, a non-transitory computer-readable medium includes instructions that, when executed by a controller of an aircraft, cause the controller to perform operations including determining, for a first time, a first speed value based on a first signal from a first data source. The operations also include determining, for the first time, a second speed value based on a second signal from a second data source. The operations further include determining, for the first time, a first likelihood of icing value based on a third signal from a third data source. The operations also include determining, for the first time, a second likelihood of icing value based on a fourth signal from a fourth data source. The operations further include performing a first comparison between the first speed value and the second speed value and performing a second comparison between the first likelihood of icing value and the second likelihood of icing value. The operations also include generating sensor reliability data based on the first comparison and the second comparison and displaying situational awareness data based on the sensor reliability data.

One advantage of the above-described implementation is improved pilot situational awareness. Additionally, the features, functions, and advantages that have been described can be achieved independently in various implementations or can be combined in yet other implementations, further details of which are disclosed with reference to the following description and drawings.

DETAILED DESCRIPTION

Figure 1:
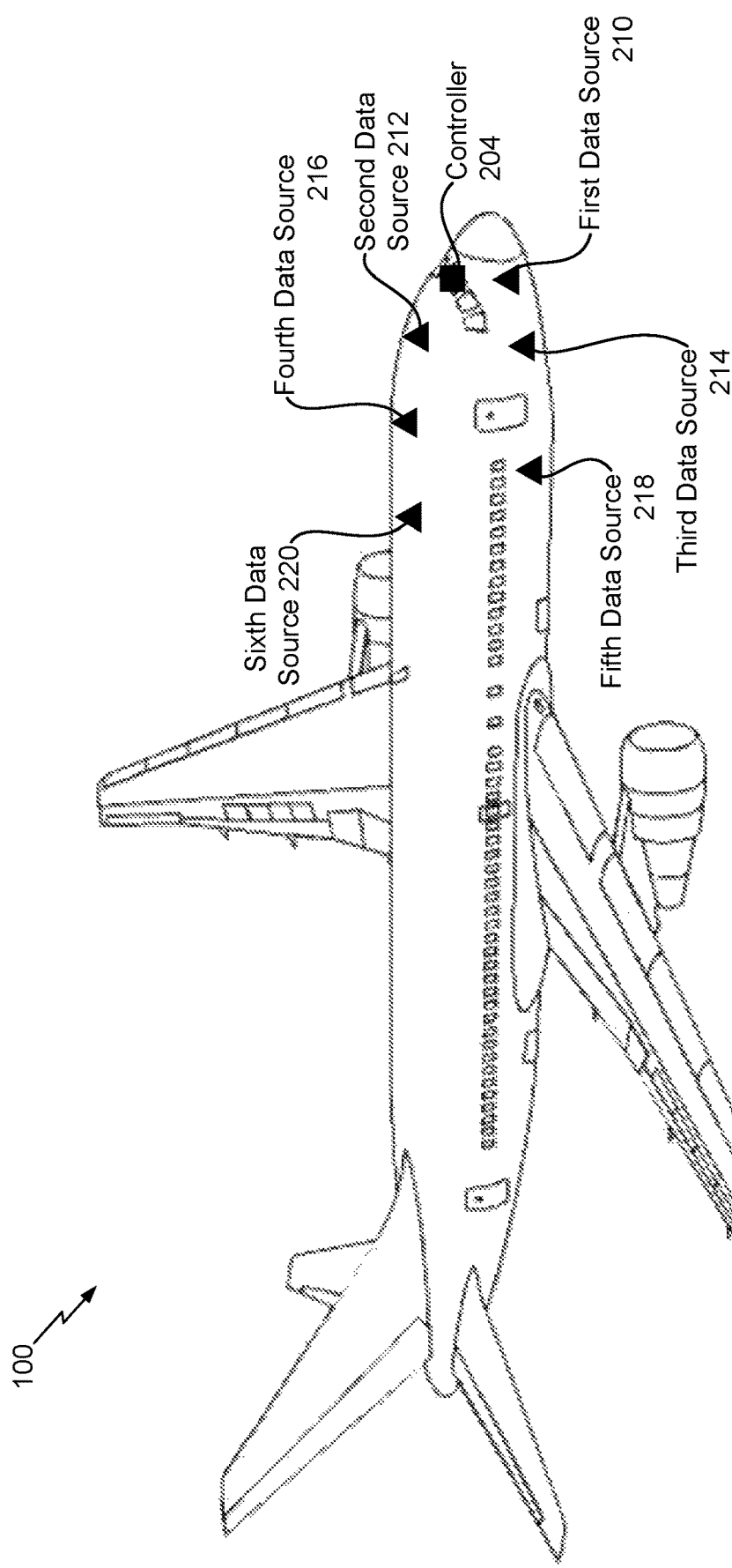
FIG. 1 is a diagram of an aircraft that includes a controller operable to improve pilot situational awareness.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The techniques described herein improve pilot situational awareness by, for example, providing notification to the pilot when a sensor may be unreliable, automatically selecting a more reliable data source for particular information from a set of data sources, or both. As a specific example, an aircraft system can determine whether data from a particular lateral speed sensor is reliable by performing cross-checking operations with other sensors. In this example, the other sensors can be sensors that sense information other than lateral speed. Thus, rather than, or in addition to, using redundant lateral speed sensors, the techniques described herein use other sensors to determine whether the data output by the particular lateral speed sensor is likely to be correct. Data from the other sensors is used, for example, to determine whether a condition exists that would call into question the reliability of the particular lateral speed sensor. To illustrate, if the lateral speed sensor includes a pitot tube, functionality of the pitot tube can be affected by icing conditions. In this illustrative example, the other sensors can include sensors to determine whether icing conditions exist. If icing conditions are present, the reliability of sensor data from the pitot tube may be questionable. In another illustrative example, even if no clear determination can be made as to whether icing conditions exist, a lateral speed change is generally accompanied by or correlated with a vertical speed change. Thus, data from a vertical speed sensor can be used to determine whether data from a lateral speed sensor is likely to be reliable.

If a particular sensor is suspected of being inaccurate or unreliable, the pilot can be notified. For example, a controller on board the aircraft can cause a notification to be displayed to the pilot indicating that the particular sensor is suspect or unreliable. The controller can also provide output indicating sensed values from a more reliable sensor, and can generate a maintenance alert indicating that maintenance should be performed on the particular sensor. If the particular sensor is a primary data source for a flight critical operation, the controller can also cause the flight critical operation to be performed using data from the more reliable sensor. Pilot situational awareness is improved by automatically notifying the pilot of suspect or unreliable sensor data. The pilot situational awareness can also be improved by automatically providing the pilot with information based on a more reliable data source.

FIG. 1 is a diagram of an aircraft 100. The aircraft 100 includes a first data source 210, a second data source 212, a third data source 214, a fourth data source 216, a fifth data source 218, and a sixth data source 220. As used herein, a "data source" can include an onboard sensor, an onboard instrument, or a device that is operable to receive data from off-board the aircraft 100. Although six data sources 210-220 are illustrated in FIG. 1, in other implementations, the aircraft 100 includes more than six data sources or fewer than six data sources. In FIG. 1, the data sources 210-220 are positioned at different locations within or on the aircraft 100. The locations of the data sources 210-220 in FIG. 1 are merely for illustrative purposes and should not be construed as limiting. The aircraft 100 also includes a controller 204 that is coupled (e.g., electrically coupled) to or in communication with one or more of the data sources 210-220.

Figure 2:
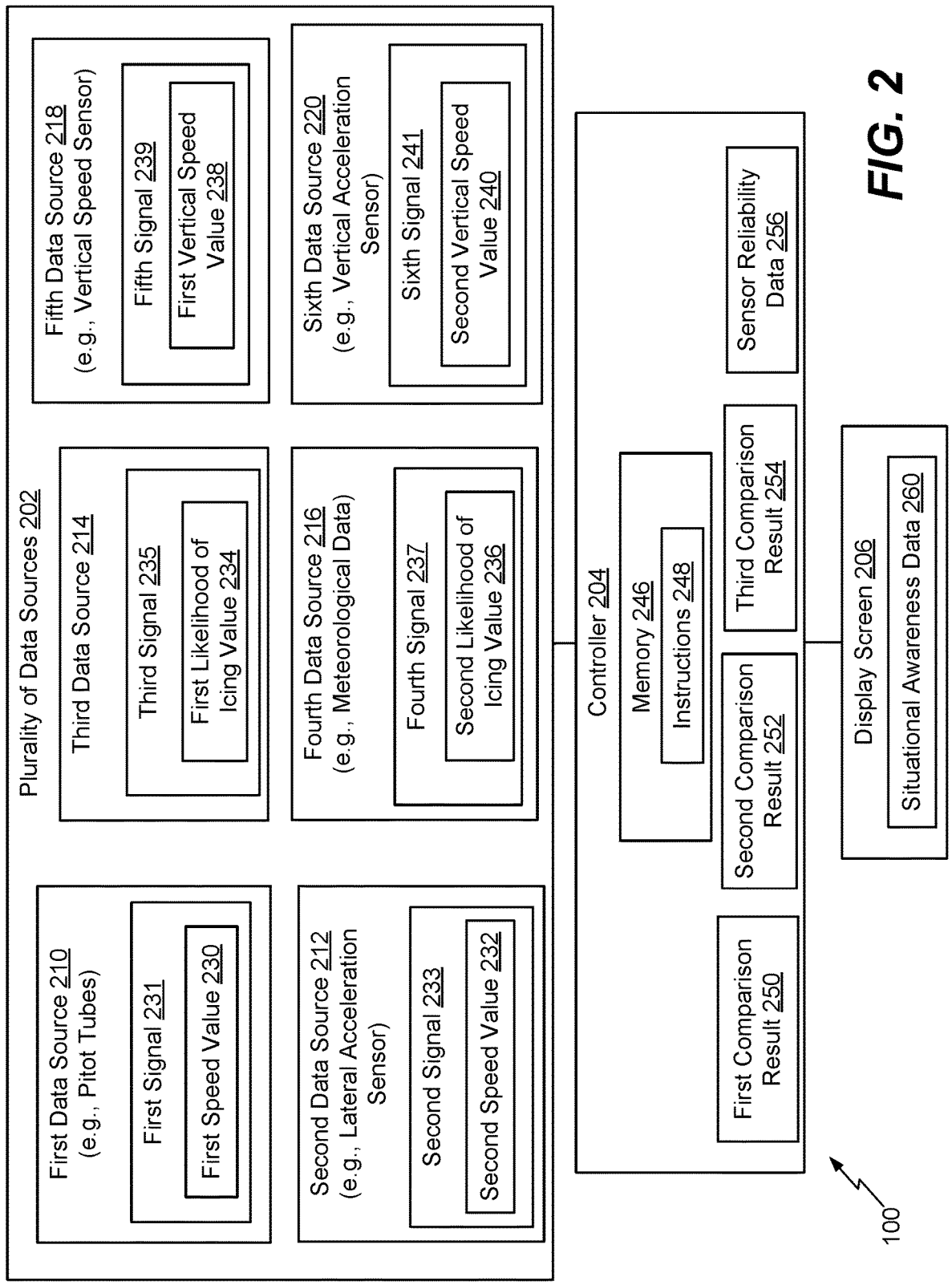
FIG. 2 is a block diagram of the aircraft that includes the controller operable to improve pilot situational awareness.

As described with respect to FIG. 2, the controller 204 is operable to use data from one or more of the data sources 210-220 to check reliability of data from one or more of the other data sources 210-220. As a specific example, the controller 204 can be configured to determine the reliability of a lateral speed sensor (e.g., the first data source 210) by performing cross-checking operations with the other data sources 212, 214, 216, 218, 220. To illustrate, a lateral speed reading generated by the first data source 210 can be compared to a lateral speed reading derived from multiple acceleration readings generated by the second data source 212. If the lateral speed reading generated by the first data source 210 differs significantly (e.g., by more than a threshold) from the lateral speed reading derived from an acceleration readings, the controller 204 determines that at least one of the first data source 210 or the second data source 212 is suspect. To determine which data source 210, 212 is suspect, the controller 204 can determine whether it is likely that a condition exists that could lead to unreliability of one of the data sources 210, 212. To illustrate, if the first data source 210 includes a pitot tube, icing conditions can cause the pitot tube to be less reliable than it normally is. In this illustration, the controller 204 can determine whether icing conditions are likely based on data from the third data source 214 and/or the fourth data source 216. As another illustrative example, if the first data source 210 indicates a change in lateral speed and the second data source 212 does not indicate a change in lateral speed, the controller 204 can use data from the fifth data source 218 and/or the sixth data source 220 to determine whether the aircraft 100 experienced a change in vertical speed. Since a change in lateral speed is generally accompanied by a change in vertical speed, data related to the change in vertical speed can be used to determine which of the first and second data sources 210, 212 is providing the more reliable lateral speed value.

As explained above, in some implementations, the aircraft 100 includes fewer than six data sources 210-220. In the example illustrated in FIG. 1, the data sources are logically grouped in pairs, with each pair generating or being used to derive a particular type of data. Such logical grouping means that each type of data is provided by two different types of data sources. To illustrate, in the examples described above, the first data source 210 generates lateral speed data and the second data source 212 generates lateral acceleration data, which is processed to calculate a lateral speed value. Similarly, the third data source 214 can include a group of sensors (e.g., temperature, pressure, and humidity sensors) that provide data used to determine whether icing conditions are likely, and the fourth data source 216 can include a receiver to receive meteorological data (e.g., nowcast data) from an off-board meteorological station. In this example, the meteorological data can be used to determine whether icing conditions are likely. In some implementations, a single data source can be used to determine the likelihood of icing conditions, in which case, the aircraft 100 can include fewer than six data sources.

In some redundant sensor systems, voting can be used to determine which sensors of a set of sensors are more likely to be reliable. Such voting operations typically use sensors in sets of three, in which case two sensors that agree are considered reliable, and data from the third sensor is discarded as unreliable. Embodiments disclosed herein enable use of at least two sensors of a particular type while still enabling selection of a more reliable sensor of the at least two sensors by using one or more sensors of other types of data on-board the aircraft 100. To illustrate, rather than providing three redundant lateral speed sensors and using voting to select the more reliable sensors of the three, the aircraft 100 can include a single lateral speed sensor (e.g., the first data source 210) and another sensor (e.g., the second data source 212) that outputs data that can be used to estimate the lateral speed (e.g., an accelerometer or a global positioning system (GPS) receiver). If the lateral speed values generated by these two diverse data sources agree (within a threshold), then the lateral speed values are considered reliable. However, if the lateral speed values generated by these two diverse data sources disagree, other data sources of the aircraft 100 that generate other types of data (for other purposes) can be used to determine which of the lateral speed values is more reliable.

FIG. 2 is a block diagram of the aircraft 100. The aircraft 100 includes a plurality of data sources 202, the controller 204 coupled to the plurality of data sources 202, and a display screen 206 coupled to the controller 204. The plurality of data sources 202 includes the first data source 210, the second data source 212, the third data source 214, the fourth data source 216, the fifth data source 218, and the sixth data source 220. According to one implementation, the display screen 206 is located in (or proximate to) a cockpit of the aircraft 100.

In FIG. 2, the first data source 210 includes a lateral speed sensor (e.g., one or more pitot tubes, a GPS receiver, etc.). The first data source 210 is configured to generate a first signal 231 that indicates a first speed value 230 corresponding to a lateral speed parameter. The lateral speed parameter indicates a current lateral speed of the aircraft 100 or a change in lateral speed of the aircraft 100. For example, if the first data source 210 is a pitot tube, the first data source 210 determines airspeed (e.g., the first speed value 230) of the aircraft 100 based on a pressure differential of pressure sensors of the first data source 210.

In FIG. 2, the second data source 212 includes a lateral acceleration sensor. The second data source 212 is configured to generate a second signal 233 (e.g., an instantaneous lateral acceleration value) that is processed to generate a second speed value 232. For example, the second data source 212 can determine (e.g., derive) a change in lateral speed of the aircraft 100 based on the lateral acceleration value. In some implementations, the second data source 212 derives the lateral speed of the aircraft 100 and generates the second signal 233 including the second speed value 232. In other implementations, the second data source 212 outputs the lateral acceleration value via the second signal 233, and the controller 204 calculates the second speed value 232 based on the lateral acceleration value. In some implementations, the controller 204 uses data from the second data source 212 to determine (or to detect) a change in lateral speed rather than to estimate an actual lateral speed value. In such implementations, the second signal 233 includes the lateral acceleration data, and the controller 204 determines (or detects) the change in lateral speed based on the lateral acceleration data.

In FIG. 2, the third data source 214 is configured to generate a third signal 235 that indicates or can be used to determine a first likelihood of icing value 234. The likelihood of icing indicates a probability that the aircraft 100 or a portion thereof (e.g., a pitot tube) is experiencing ice buildup. In some implementations, the third data source 214 includes at least one of a humidity sensor, a pressure sensor, or a temperature sensor. In some implementations, the third data source 214 includes the humidity sensor, the pressure sensor, and the temperature sensor. The humidity sensor can measure a humidity of an environment surrounding the aircraft 100, the temperature sensor can measure a temperature of the environment surrounding the aircraft 100, and the pressure sensor can measure a pressure of the environment surrounding the aircraft 100. The third data source 214 can determine that there is a high likelihood of ice generation at the aircraft 100 based on measuring particular humidity, temperature, and pressure conditions, and can determine that there is a low likelihood (or no likelihood) of ice generation at the aircraft 100 based on measuring other humidity, temperature, and pressure conditions.

In FIG. 2, the fourth data source 216 is configured to generate a fourth signal 237 that indicates a second likelihood of icing value 236. For example, the fourth data source 216 can calculate a likelihood of ice generation at the aircraft 100 based on remotely sensed or remotely gathered meteorological data (e.g., nowcast data). According to one implementation, the fourth data source 216 can receive ground observation data (e.g., meteorologist data or meteorologist reports) to determine the likelihood of ice generation at the aircraft 100. According to another implementation, the fourth data source 216 can receive real-time data (e.g., nowcast data) to determine the likelihood of ice generation at the aircraft 100.

In FIG. 2, the fifth data source 218 includes a vertical speed sensor. The fifth data source 218 is configured to generate a fifth signal 239 that indicates a first vertical speed value 238. The sixth data source 220 includes a vertical acceleration sensor. The sixth data source 220 is configured to generate a sixth signal 241 that indicates a second vertical speed value 240. For example, the sixth data source 220 can determine (e.g., derive) the second vertical speed value 240 based on the vertical acceleration sensor and send the second vertical speed value 240 to the controller 204 via the sixth signal 241. Alternatively, the sixth signal 241 can include vertical acceleration data that the controller 204 can use to determine the second vertical speed value 240. In some implementations, the controller 204 uses data from the sixth data source 220 to determine (or to detect) a change in vertical speed rather than to estimate an actual vertical speed value. In such implementations, the sixth signal 241 includes the vertical acceleration data, and the controller 204 determines (or detects) the change in vertical speed based on the vertical acceleration data.

The controller 204 includes a memory 246. The memory 246 is a non-transitory computer-readable medium that stores instructions 248. The controller 204 is operable to execute the instructions 248 to perform the operations described herein. The controller 204 is configured to generate sensor reliability data 256 that indicates which of the speed values 230, 232 is more reliable based on a cross-checking technique. To illustrate, the controller 204 is configured perform a first comparison between the first speed value 230 and the second speed value 232 to generate a first comparison result 250. If the first comparison result 250 indicates that a difference between the first speed value 230 and the second speed value 232 is relatively small (e.g. less than a threshold), the controller 204 causes the sensor reliability data 256 to indicate that the data sources 210, 212 are providing accurate data (e.g., both the first and second speed values 230, 232 are reliable). The sensor reliability data 256 can be presented, as situational awareness data 260, via the display screen 206. Alternatively, or in addition, the situational awareness data 260 can include a reliable speed value, from the first data source 210 or the second data source 212, with or without an indication that the data sources 210, 212 are properly functioning.

However, if the first comparison result 250 indicates that the difference between the first speed value 230 and the second speed value 232 is relatively large (e.g., greater than a threshold), the controller 204 uses other data to determine which of the speed values 230, 232 is more reliable. For example, the controller 204 can determine whether icing conditions could be affecting one of the data sources 210, 212. To ensure that the evaluation of icing conditions is reliable, in the example illustrated in FIG. 2, the controller 204 performs a second comparison between the first likelihood of icing value 234 and the second likelihood of icing value 236 to generate a second comparison result 252. If the second comparison result 252 indicates that a difference between the first likelihood of icing value 234 and the second likelihood of icing value 236 is relatively small (e.g., less than a second threshold), either likelihood of icing value 234, 236 can be used to determine whether it is likely that icing conditions make one of the speed values 230, 232 more reliable that the other. For example, if both of the icing values 234, 236 indicate that icing is very likely (e.g., more likely than a high likelihood icing threshold), the first data source 210 can be considered unreliable if the first data source 210 is a pitot tube. Alternatively, if both of the icing values 234, 236 indicate that icing is very unlikely (e.g., less likely than low likelihood icing threshold), the second data source 212 can be considered unreliable if the first data source 210 is a pitot tube. In either of these examples, the sensor reliability data 256 can include a reliable speed value, from the more reliable of the first and second data sources 210, 212. The sensor reliability data 256 can also include an indication of which of the data sources 210, 212 is functioning properly, an indication of which of the data sources 210, 212 is not functioning properly, or both.

If the first comparison result 250 indicates that the difference between the speed values 230, 232 is relatively large (e.g., greater than the threshold) and the second comparison result 252 indicates that the difference between the likelihood of icing values 234, 236 is also relatively large (e.g., greater than the second threshold), the controller 204 can determine which of the speed values 230, 232 is more reliable based on changes in vertical speed. Generally, a relatively large change in lateral speed is expected to be associated with change in vertical speed. Thus, if one of the speed values 230, 232 indicates a change in lateral speed, the controller 204 can determine, based on one or both of the vertical speed values 238, 240, whether a corresponding vertical speed change has occurred. If a vertical speed change occurred, then the speed value 230, 232 that is consistent with the vertical speed change is more likely to be reliable than the other speed value 230, 232.

For example, the controller 204 can perform a third comparison between a first vertical speed change indicated by the first vertical speed value 238 and a second vertical speed change indicated by the second vertical speed value 240 to generate a third comparison result 254. If the third comparison result 254 indicates that a difference between the vertical speed changes indicated by the first and second vertical speed values 238, 240 is relatively small (e.g., is less than a third threshold), the controller 204 determines that the vertical speed change indicated by either the first or the second vertical speed value 238, 240 is reliable. Further, the controller 204 determines that whichever of the speed values 230, 232 is consistent with the vertical speed change is the more reliable speed value 230, 232. To illustrate, if the first vertical speed value 238 and the second vertical speed value 240 agree that a vertical speed change occurred, the speed value 230, 232 that is consistent with the direction and magnitude of the vertical speed change is the more reliable of the speed values 230, 232. Alternatively, if the first vertical speed value 238 and the second vertical speed value 240 agree that no vertical speed change occurred, the speed value 230, 232 that is consistent with no vertical speed change is the more reliable of the speed values 230, 232. In either of these examples, the sensor reliability data 256 can include a reliable speed value, from the more reliable of the first and second data sources 210, 212. The sensor reliability data 256 can also include an indication of which of the data sources 210, 212 is functioning properly, an indication of which of the data sources 210, 212 is not functioning properly, or both.

If the third comparison result 254 indicates that a difference between the vertical speed changes indicated by the first and second vertical speed values 238, 240 is relatively large (e.g., is greater than the third threshold), the vertical speed change is not a conclusive indicator of which of the first or the second vertical speed value 238, 240 is more reliable. In this situation, the sensor reliability data 256 can include an indication that no reliable lateral speed value can be determined, or an indication that both the first speed value 230 and the second speed value 232 are suspect.

Although the description above refers to making decisions based on comparing various values to respective thresholds, in some implementations, machine learning techniques can be used to make some or all of these decisions. For example, an artificial neural network can be trained, based on historical data, to determine whether a particular first comparison result is indicative of a significant difference between the first speed value 230 and the second speed value 232. In this example, the historical data can include a large variety of other parameters in addition to lateral speed, and thus the artificial neural network can be trained in a manner that accounts for these other parameters. To illustrate, the other parameters can include altitude, meteorological conditions, aircraft type, aircraft operational or mission limits, etc. Thus, rather than supplying a large number of different thresholds that can be selected based on these other parameters, the artificial neural network can determine, without reference to thresholds, whether a particular first comparison result 250 is indicative of a larger than acceptable difference between the first speed value 230 and the second speed value 232. Likewise, any or all of the other thresholds described above can be omitted and a corresponding decision can be made using a machine learning technique, such as an artificial neural network. One advantage of using such machine learning techniques may be that trends of data values can also be accounted for. To illustrate, over time the first comparison result 250 could indicate a cyclic variation. Such cyclic variations may never exceed a pre-defined threshold, and yet such variations can still indicate that one of data sources 210, 212 is experiencing unusual activity and may therefore be unreliable or suspect. Machine learning techniques, such as a recurrent neural network, can account for such trends and detect potential sensor reliability concerns.

Figure 3:
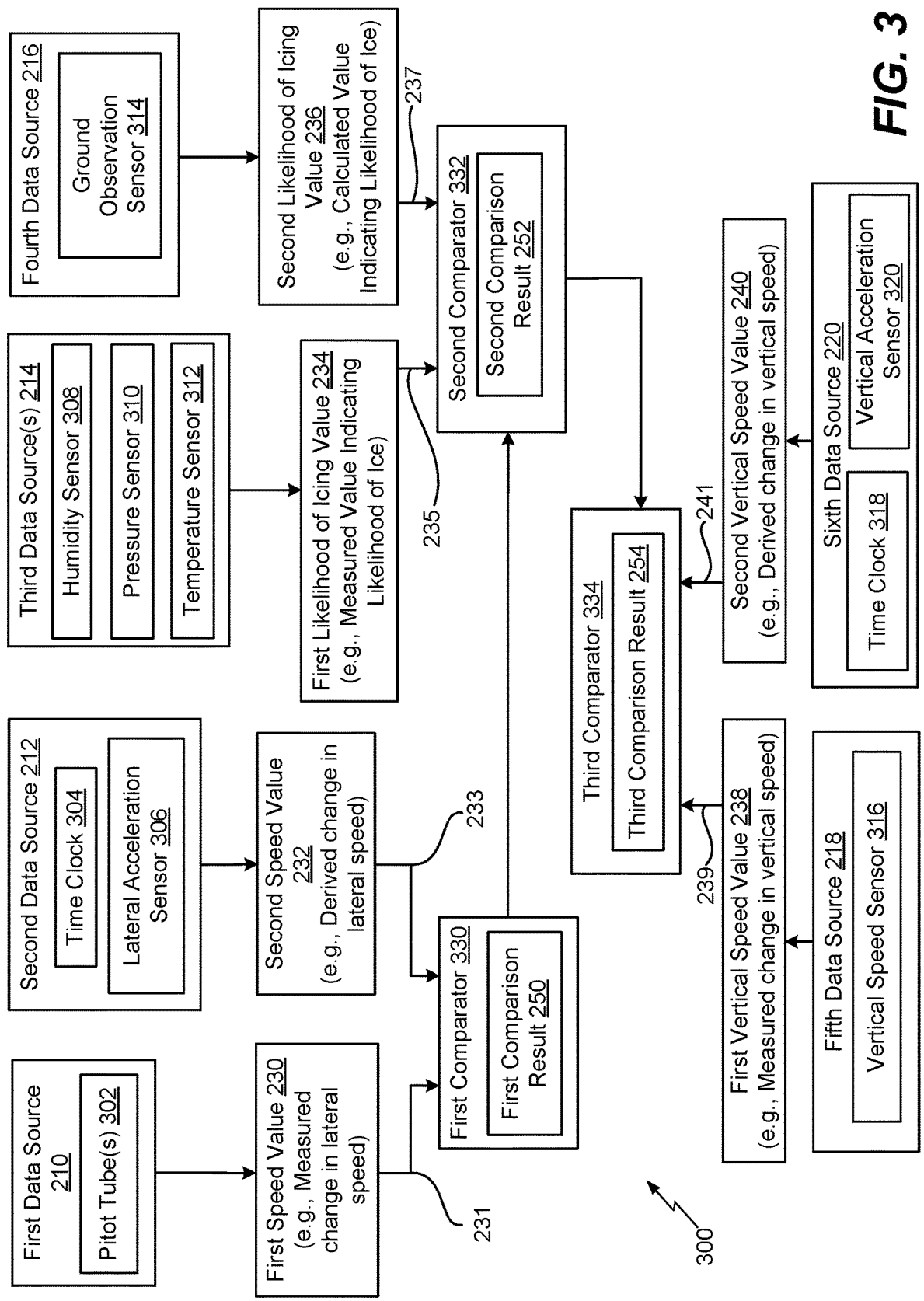
FIG. 3 is a diagram of a system that is operable to improve pilot situational awareness.

FIG. 3 is a diagram of a system 300 that is operable to improve pilot situational awareness. The system 300 can be integrated into the aircraft 100. The system 300 includes the plurality of data sources 202 (shown in FIG. 2). For example, the system 300 includes the first data source 210, the second data source 212, the third data source 214, the fourth data source 216, the fifth data source 218, and sixth data source 220. Additionally, the system 300 includes a first comparator 330, a second comparator 332, and a third comparator 334. According to one implementation, the comparators 330, 332, 334 are integrated into the controller 204 (shown in FIG. 2).

The first data source 210 includes one or more pitot tubes 302. The first data source 210 is configured to generate the first signal 231 that indicates the first speed value 230 corresponding to the lateral speed parameter. The lateral speed parameter indicates the current lateral speed of the aircraft 100 or the change in lateral speed of the aircraft 100. For example, the one or more pitot tubes 302 determines the airspeed (e.g., the first speed value 230) of the aircraft 100 based on a pressure differential of pressure sensors of the first data source 210.

The second data source 212 includes a lateral acceleration sensor 306. The second data source 212 is configured to generate the second signal 233 (e.g., the instantaneous lateral acceleration value) that is processed to generate the second speed value 232. For example, the second data source 212 can determine (e.g., derive) the change in lateral speed of the aircraft 100 based on the lateral acceleration value and a change in time indicated by a time clock 304. In some implementations, the second data source 212 derives the lateral speed of the aircraft 100 and generates the second signal 233 including the second speed value 232.

The third data source 214 is configured to generate the third signal 235 that indicates or can be used to determine the first likelihood of icing value 234. The likelihood of icing indicates the probability that the aircraft 100 or a portion thereof (e.g., the one or more pitot tubes 302) is experiencing ice buildup. The third data source 214 includes at least one of a humidity sensor 308, a pressure sensor 310, or a temperature sensor 312. In some implementations, the third data source 214 includes the humidity sensor 308, the pressure sensor 310, and the temperature sensor 312. The humidity sensor 308 can measure the humidity of the environment surrounding the aircraft 100, the temperature sensor 312 can measure the temperature of the environment surrounding the aircraft 100, and the pressure sensor 310 can measure the pressure of the environment surrounding the aircraft 100. The third data source 214 can determine that there is a high likelihood of ice generation at the aircraft 100 based on measuring particular humidity, temperature, and pressure conditions, and can determine that there is a low likelihood (or no likelihood) of ice generation at the aircraft 100 based on measuring other humidity, temperature, and pressure conditions.

The fourth data source 216 is configured to generate the fourth signal 237 that indicates the second likelihood of icing value 236. For example, the fourth data source 216 can calculate a likelihood of ice generation at the aircraft 100 based on remotely sensed or remotely gathered meteorological data (e.g., nowcast data). According to one implementation, the fourth data source 216 can receive ground observation data (e.g., meteorologist data or meteorologist reports) from a ground observation sensor 314 to determine the likelihood of ice generation at the aircraft 100. According to another implementation, the fourth data source 216 can receive real-time data (e.g., nowcast data) to determine the likelihood of ice generation at the aircraft 100.

The fifth data source 218 includes a vertical speed sensor 316. The fifth data source 218 is configured to generate the fifth signal 239 that indicates the first vertical speed value 238. The sixth data source 220 includes a vertical acceleration sensor 320. The sixth data source 220 is configured to generate the sixth signal 241 that indicates the second vertical speed value 240. For example, the sixth data source 220 can determine (e.g., derive) the second vertical speed value 240 based on the vertical acceleration sensor 320 and a time clock 318.

The first comparator 330 is configured perform a first comparison between the first speed value 230 and the second speed value 232 to generate the first comparison result 250. If the first comparison result 250 indicates that the difference between the first speed value 230 and the second speed value 232 is relatively small (e.g., less than a threshold), the sensor reliability data 256 of FIG. 2 indicates that the data sources 210, 212 are providing accurate data (e.g., both the first and second speed values 230, 232 are reliable).

However, if the first comparison result 250 indicates that the difference between the first speed value 230 and the second speed value 232 is relatively large (e.g., greater than a threshold), the system 300 uses other data to determine which of the speed values 230, 232 is more reliable. For example, the system 300 can determine whether icing conditions could be affecting one of the data sources 210, 212. To ensure that the evaluation of icing conditions is reliable, in the example illustrated in FIG. 3, the second comparator 332 performs a second comparison between the first likelihood of icing value 234 and the second likelihood of icing value 236 to generate the second comparison result 252. If the second comparison result 252 indicates that a difference between the first likelihood of icing value 234 and the second likelihood of icing value 236 is relatively small (e.g., less than a second threshold), either likelihood of icing value 234, 236 can be used to determine whether it is likely that icing conditions make one of the speed values 230, 232 more reliable that the other. For example, if both of the icing values 234, 236 indicate that icing is very likely (e.g., more likely than a high likelihood icing threshold), the first data source 210 can be considered unreliable since the first data source 210 includes the pitot tube(s) 302. Alternatively, if both of the icing values 234, 236 indicate that icing is very unlikely (e.g., less likely than low likelihood icing threshold), the second data source 212 can be considered unreliable.

If the first comparison result 250 indicates that the difference between the speed values 230, 232 is relatively large (e.g., greater than the threshold) and the second comparison result 252 indicates that the difference between the likelihood of icing values 234, 236 is also relatively large (e.g., greater than the second threshold), the system 300 can determine which of the speed values 230, 232 is more reliable based on changes in vertical speed. Generally, a relatively large change in lateral speed is expected to be associated with a change in vertical speed. Thus, if one of the speed values 230, 232 indicates a change in lateral speed, the system 300 can determine, based on one or both of the vertical speed values 238, 240, whether a corresponding vertical speed change has occurred. If a vertical speed change occurred, then the speed value 230, 232 that is consistent with the vertical speed change is more likely to be reliable than the other speed value 230, 232.

For example, the third comparator 334 can perform a third comparison between the first vertical speed change indicated by the first vertical speed value 238 and the second vertical speed change indicated by the second vertical speed value 240 to generate the third comparison result 254. If the third comparison result 254 indicates that a difference between the vertical speed changes indicated by the first and second vertical speed values 238, 240 is relatively small (e.g., is less than a third threshold), the system 300 determines that the vertical speed change indicated by either the first or the second vertical speed value 238, 240 is reliable. Further, the system 300 determines that whichever of the speed values 230, 232 is consistent with the vertical speed change is the more reliable speed value 230, 232. To illustrate, if the first vertical speed value 238 and the second vertical speed value 240 agree that a vertical speed change occurred, the speed value 230, 232 that is consistent with the direction and magnitude of the vertical speed change is the more reliable of the speed values 230, 232. Alternatively, if the first vertical speed value 238 and the second vertical speed value 240 agree that no vertical speed change occurred, the speed value 230, 232 that is consistent with no vertical speed change is the more reliable of the speed values 230, 232.

If the third comparison result 254 indicates that a difference between the vertical speed changes indicated by the first and second vertical speed values 238, 240 is relatively large (e.g., is greater than the third threshold), the vertical speed change is not a conclusive indicator of which of the first or the second vertical speed value 238, 240 is more reliable.

The system 300 of FIG. 3 enables leveraging of onboard data sources, other onboard instruments, and meteorological data acquired from outside the aircraft 100 to identify sensors providing an inaccurate sensor reading. For example, the likelihood of icing values 234, 236 can be used to identify which data source 210, 212 associated with the lateral speed change is more reliable. If the likelihood of icing values 234, 236 indicate mixed results on the likelihood of icing, the vertical speed values 238, 240 can be used to identify which data source 210, 212 associated with the lateral speed change is more reliable.

Figure 4:
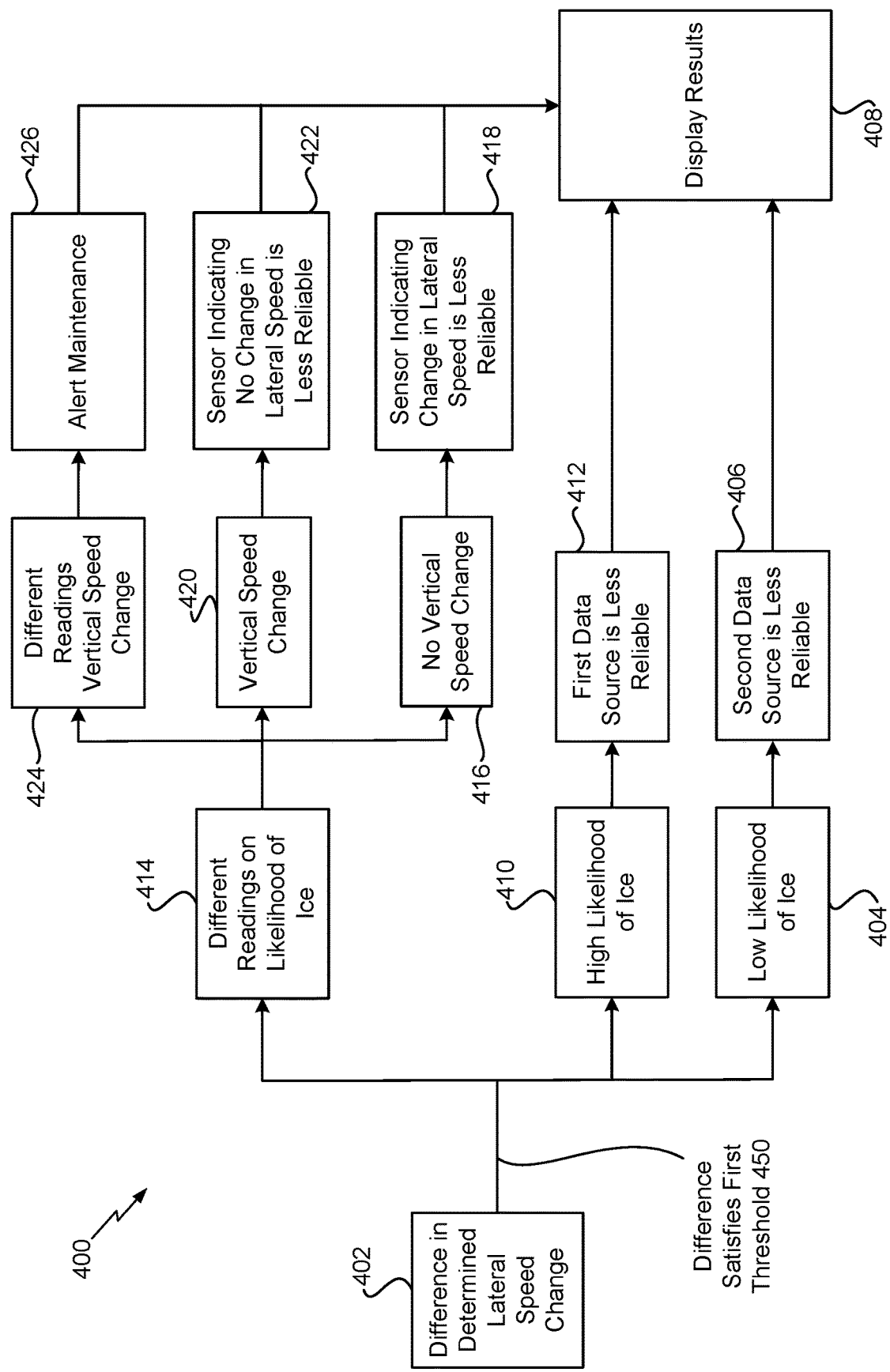
FIG. 4 is a block diagram illustrating decision logic for improving pilot situational awareness.

FIG. 4 is a block diagram illustrating decision logic 400 for improving pilot situational awareness. The decision logic 400 can be implemented using the controller 204 (shown in FIG. 2), the first comparator 330, the second comparator 332, the third comparator 334 (which comparators are shown in FIG. 3), or a combination thereof. For ease of illustration, the decision logic 400 is described with respect to the controller 204.

At 402, the controller 204 determines a difference in determined lateral speed changes. For example, the controller 204 compares the first speed value 230 (e.g., the measured change in lateral speed) determined by the first data source 210 and the second speed value 232 (e.g., the derived change in lateral speed) determined by the second data source 212 to generate the first comparison result 250 (shown in FIG. 2). If the difference fails to satisfy the first threshold (e.g., the first comparison result 250 fails to satisfy the first threshold or the difference is relatively small), the controller 204 determines that the first data source 210 and the second data source 212 are reliable. However, if the difference satisfies the first threshold, at 450, (e.g., the first comparison result 250 satisfies the first threshold or the difference is relatively large), the controller 204 cross-checks the data sources 210, 212 by using additional data sources to determine which data source 210, 212 is more reliable.

To illustrate, if the controller 204 determines that there is a low likelihood of ice, at 404, the controller 204 determines that the second data source 212 is less reliable than the first data source 210, at 406. For example, if the first likelihood of icing value 234 and the second likelihood of icing value 236 indicate that there is a relatively low likelihood of ice generation at the aircraft 100, the controller 204 determines that the second data source 212 is less reliable than the first data source 210. The controller 204 displays an indication (e.g., the situational awareness data 260) that the second data source 212 is less reliable than the first data source, at 408. According to one implementation, the controller 204 can display the first speed value 230 as the situational awareness data 260, at 408.

If the controller 204 determines that there is a high likelihood of ice, at 410, the controller 204 determines that the first data source 210 is less reliable than the second data source 212, at 412. For example, if the first likelihood of icing value 234 and the second likelihood of icing value 236 indicate that there is a relatively high likelihood of ice generation at the aircraft 100, the controller 204 determines that the first data source 210 is less reliable than the second data source 212. The controller 204 can display an indication (e.g., the situational awareness data 260) that the first data source 210 is less reliable than the second data source, at 408. According to one implementation, the controller 204 can display the second speed value 232 as the situational awareness data 260, at 408.

If the likelihood of icing values 234, 236 have different (e.g., inconsistent) readings on the likelihood of ice generation, at 414, the controller 204 uses additional sensor readings (e.g., the vertical speed values 238, 240) to identify the data source 210, 212 that is less reliable. For example, if the controller 204 determines that there is no vertical speed change, at 416, the controller 204 determines that the data source 210, 212 indicating a change in lateral speed is less reliable, at 418. Thus, if the vertical speed values 238, 240 indicate there is no vertical speed change and the first speed value 230 indicates there is a change in lateral speed, the controller 204 determines that the first data source 210 is less reliable than the second data source 212. The controller 204 can display an indication (e.g., the situational awareness data 260) that the data source indicating a change in lateral speed is less reliable, at 408.

If the controller 204 determines that there is a vertical speed change, at 420, the controller 204 determines that the data source 210, 212 indicating no change in lateral speed is less reliable, at 422. Thus, if the vertical speed values 238, 240 indicate there is a vertical speed change and the first speed value 230 indicates there is no change in lateral speed, the controller 204 determines that the first data source 210 is less reliable than the second data source 212. The controller 204 can display an indication (e.g., the situational awareness data 260) that the data source indicating a change in lateral speed is less reliable, at 408. If the vertical speed values 238, 240 have inconsistent readings, at 424, the controller 204 can determine to alert maintenance, at 426, to troubleshoot the data sources 210-220. The controller 204 can also display an indication (e.g., situational awareness data 260) regarding the inconsistent readings, at 408.

The decision logic 400 of FIG. 4 enables leveraging of onboard data sources, other onboard instruments, and/or meteorological data acquired from outside the aircraft 100 to identify sensors providing an inaccurate sensor reading. For example, the likelihood of icing data 404, 410 can be used to identify which data source associated with the lateral speed change is more reliable. If the likelihood of icing data 404, 410 indicate mixed results on the likelihood of icing, the vertical speed data 416, 420 can be used to identify which data source associated with the lateral speed change is more reliable.

Figure 5:
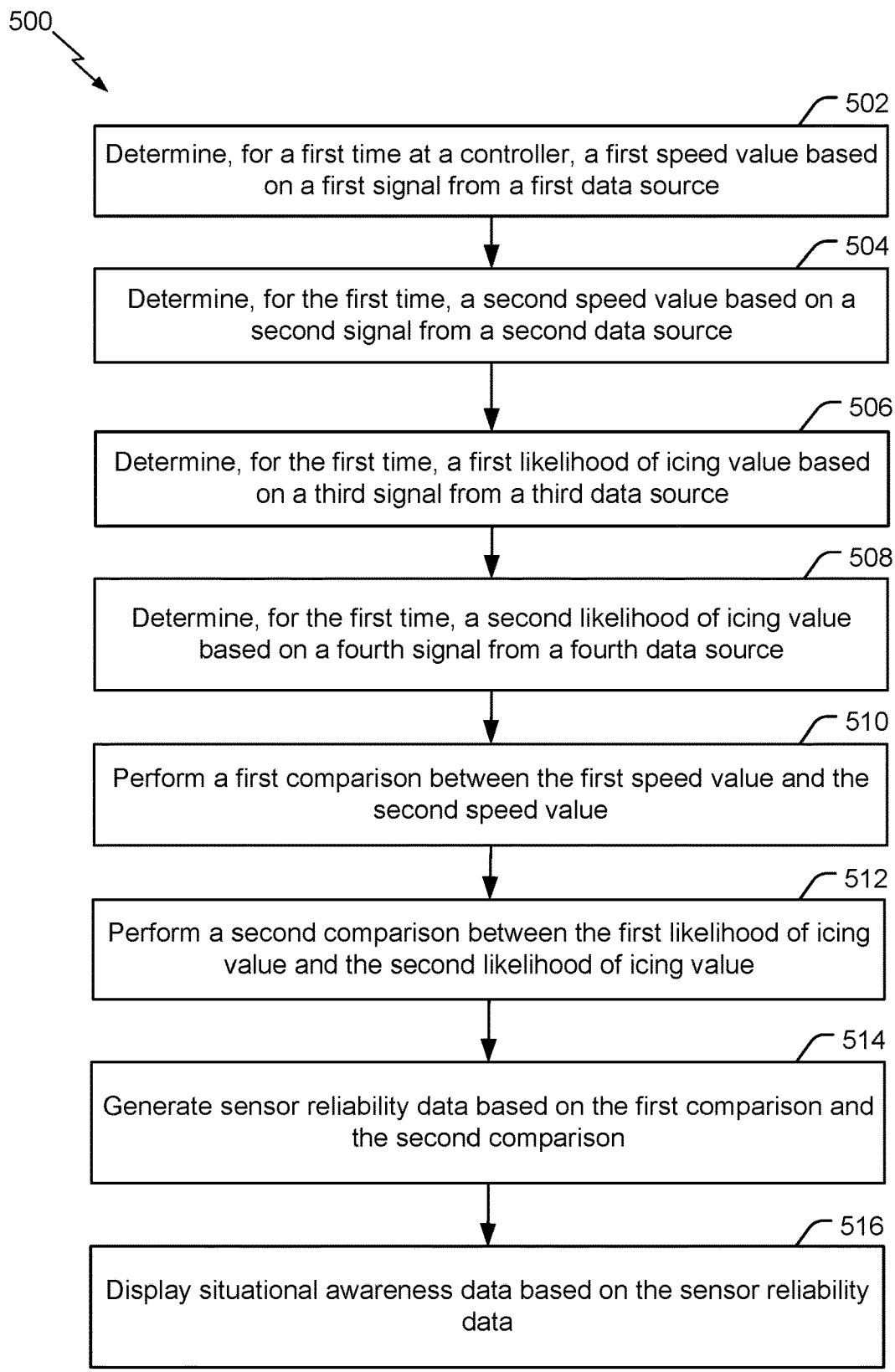
FIG. 5 is a flowchart illustrating a method for improving pilot situational awareness.

Referring to FIG. 5, a flowchart of a method 500 for improving pilot situational awareness. The method 500 can be performed by the plurality of data sources 202, the controller 204, the display screen 206, the first comparator 330, the second comparator 332, the third comparator 334, or a combination thereof.

The method 500 includes determining, for a first time at a controller, a first speed value based on a first signal from a first data source, at 502. For example, referring to FIG. 2, the controller 204 determines the first speed value (e.g., the measured change in lateral speed of the aircraft 100) based on the first signal 231 received from the first data source 210. According to one implementation, the first data source 210 includes at least one of a pitot tube (e.g., the pitot tubes 302) or a global positioning system receiver. As used herein, determining a particular value for a "first time" corresponds to determining the particular value for the first time during a particular sensor cross-check operation. For example, each time a sensor cross-check is initiated at the aircraft 100, the first sensor reading for a particular sensor during the sensor cross-check corresponds to the "first time" a particular value for the particular sensor is determined.

The method 500 also includes determining, for the first time, a second speed value based on a second signal from a second data source, at 504. For example, referring to FIG. 2, the controller 204 determines the second speed value 232 (e.g., the derived change in lateral speed of the aircraft 100) based on the second signal 233 received from the second data source 212. According to one implementation, the second data source 212 includes at least one accelerometer (e.g., the lateral acceleration sensor 306).

The method 500 also includes determining, for the first time, a first likelihood of icing value based on a third signal from a third data source, at 506. For example, referring to FIG. 2, the controller 204 determines the first likelihood of icing value 234 (e.g., the measured value indicating the likelihood of ice generation at the aircraft 100) based on the third signal 235 received from the third data source 214. According to one implementation, the third data source 214 includes a plurality of on-board meteorology sensors. For example, the third data source 214 includes the humidity sensor 308, the pressure sensor 310, and the temperature sensor 312.

The method 500 also includes determining, for the first time, a second likelihood of icing value based on a fourth signal from a fourth data source, at 508. For example, referring to FIG. 2, the controller 204 determines the second likelihood of icing value 236 (e.g., the calculated value indicating the likelihood of ice generation at the aircraft 100) based on the fourth signal 237 received from the fourth data source 216. According to one implementation, the fourth data source 216 includes an off-board meteorology data transmitter. For example, the fourth data source 216 may include the ground observation sensor 314 that transmits data to the controller 204.

The method 500 also includes performing a first comparison between the first speed value and the second speed value, at 510. For example, referring to FIG. 2, the controller 204 compares the first speed value 230 to the second speed value 232 to generate the first comparison result 250. The method 500 also includes performing a second comparison between the first likelihood of icing value and the second likelihood of icing value, at 512. For example, referring to FIG. 2, the controller 204 compares the first likelihood of icing value 234 to the second likelihood of icing value 236 to generate the second comparison result 252. In some implementations, the second comparison is performed in response to the first comparison indicating that a difference between the first speed value 230 and the second speed value 232 is greater than a threshold. In yet other implementations, the first and second likelihood of icing values are in response to the first comparison indicating that the difference between the first speed value 230 and the second speed value 232 is greater than the threshold. For example, if the difference between the first speed value 230 and the second speed value 232 is greater than the threshold, the controller 204 can obtain data from the third data source 214, the fourth data source 216, or both, to perform the cross-checks described above to determine whether the first data source 210 or the second data source 212 is more reliable.

The method 500 also includes generating sensor reliability data based on the first comparison and the second comparison, at 514. For example, referring to FIG. 2, the controller 204 generates the sensor reliability data 256 based on the first comparison and the second comparison. The sensor reliability data 256 indicates that the second speed value 232 is more reliable than the first speed value 230 when the first comparison indicates that the first speed value 230 differs from the second speed value 232 by greater than a first threshold, the second comparison indicates that the first likelihood of icing value 234 differs from the second likelihood of icing value 236 by less than a second threshold, and at least one of the first likelihood of icing value 234 or the second likelihood of icing value 236 is greater than a third threshold.

The sensor reliability data 256 indicates that the first speed value 230 is more reliable than the second speed value 232 when the first comparison indicates that the first speed value 230 differs from the second speed value 232 by greater than a first threshold, the second comparison indicates that the first likelihood of icing value 234 differs from the second likelihood of icing value 236 by less than a second threshold, and at least one of the first likelihood of icing value 234 of the second likelihood of icing value 236 is less than a third threshold.

The method 500 also includes displaying situational awareness data based on the sensor reliability data, at 516. For example, referring to FIG. 2, the display screen 206 display the situational awareness data 260. The situational awareness data 260 indicates whether first speed value 230, the second speed value 232, or both, is reliable.

According to some implementations, the method 500 also includes determining, for the first time, a first vertical speed value based on a fifth signal from a fifth data source. For example, referring to FIG. 2, the controller 204 determines the first vertical speed value 238 (e.g., the measured change in vertical speed of the aircraft 100) based on the fifth signal 239 received from the fifth data source 218. The method 500 also may include determining, for the first time, a second vertical speed value based on a sixth signal from a sixth data source. For example, referring to FIG. 2, the controller 204 determines the second vertical speed value 240 (e.g., the derived change in vertical speed of the aircraft 100) based on the sixth signal 241 received from the sixth data source 220.

According to one implementation, the method 500 also includes performing a third comparison between the first vertical speed value and the second vertical speed value. The sensor reliability data is generated further based on the third comparison. For example, the controller 204 compares the first vertical speed value 238 to the second vertical speed value 240 to generate the third comparison result 254. The third comparison is performed in response to a determination that the second comparison indicates that a difference between the first likelihood of icing value 234 and the second likelihood of icing value 236 is greater than a threshold. In this scenario, the controller 204 generates the sensor reliability data 256 based on whether the first data source 210 indicates a first lateral speed change on the first speed value 230, whether the second data source 212 indicates a second lateral speed change based on the second speed value 232, whether the fifth data source 218 indicates a first vertical speed change based on the first vertical speed value 238, and whether the sixth data source 220 indicates a second vertical speed change based on the second vertical speed value 240.

The method 500 of FIG. 5 enables leveraging of onboard data sources, other onboard instruments, and meteorological data acquired from outside the aircraft 100 to identify sensors providing an inaccurate sensor reading. For example, the likelihood of icing values 234, 236 can be used to identify which data source 210, 212 associated with the lateral speed change is more reliable. If the likelihood of icing values 234, 236 indicate mixed results on the likelihood of icing, the vertical speed values 238, 240 can be used to identify which data source 210, 212 associated with the lateral speed change is more reliable.

Figure 6:
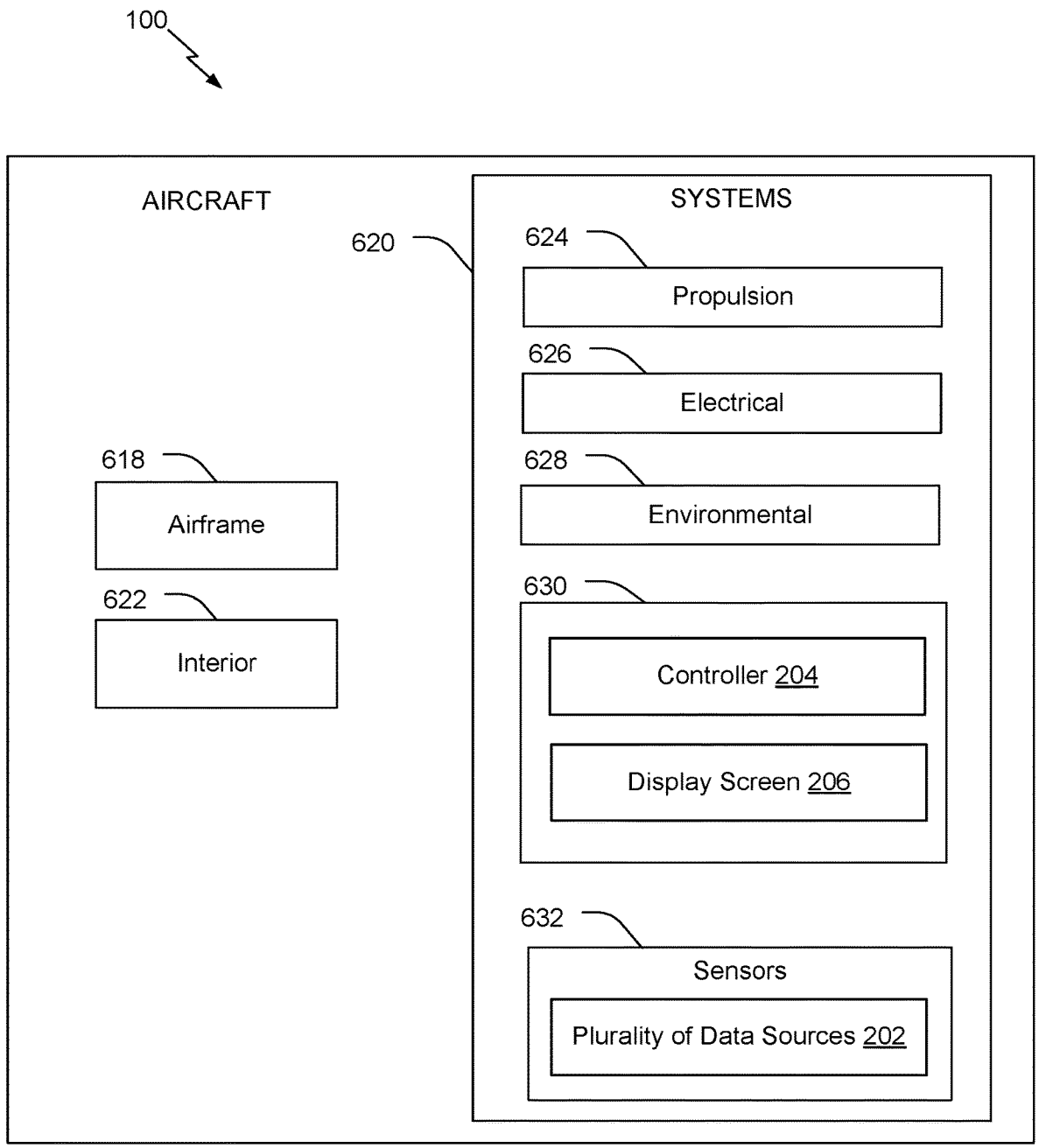
FIG. 6 is another block diagram of the aircraft of FIG. 1.

FIG. 6 is a block diagram of an illustrative implementation of the aircraft 100. As shown in FIG. 6, the aircraft 100 includes an airframe 618, a plurality of systems 620, and an interior 622. Examples of the plurality of systems 620 include one or more of a propulsion system 624, an electrical system 626, an environmental system 628, a cross-checking system 630, and a sensor system 632. The sensor system 632 includes one or more sensors onboard the aircraft 100 and configured to generate sensor data during operation of the aircraft 100. For example, the sensor system 632 includes the plurality of data sources 202. The cross-checking system 630 includes the controller 204 and the display screen 206. The cross-checking system 630 is operable to improve pilot situational awareness in a similar manner as described with respect to FIGS. 1-5.

The illustrations of the examples described herein are intended to provide a general understanding of the structure of the various implementations. The illustrations are not intended to serve as a complete description of all of the elements and features of apparatuses and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter can be directed to less than all of the features of any of the disclosed examples. Accordingly, the scope of the disclosure is defined by the following claims and their equivalents.

What is claimed is:

1. An aircraft comprising:
    a controller configured to:
        determine, for a first time, a first speed value based on a first signal from a first data source and a second speed value based on a second signal from a second data source;
        determine, for the first time, a first likelihood of icing value based on a third signal from a third data source and a second likelihood of icing value based on a fourth signal from a fourth data source;
        perform a first comparison between the first speed value and the second speed value and a second comparison between the first likelihood of icing value and the second likelihood of icing value; and
        generate sensor reliability data based on the first comparison and the second comparison, wherein the sensor reliability data indicates that the second speed value is more reliable that the first speed value in response to:
            the first comparison indicating that the first speed value differs from the second speed value by greater than a first threshold;
            the second comparison indicating that the first likelihood of icing value differs from the second likelihood of icing value by less than a second threshold; and
            at least one of the first likelihood of icing value or the second likelihood of icing value being greater than a third threshold; and
    a display screen coupled to the controller, the display screen configured to display situational awareness data based on the sensor reliability data.

2. The aircraft of claim 1, wherein the first data source comprises at least one of a pitot tube or a global positioning system receiver.

3. The aircraft of claim 1, wherein the second data source comprises at least one accelerometer.

4. The aircraft of claim 1, wherein the third data source comprises a plurality of on-board meteorology sensors.

5. The aircraft of claim 1, wherein the fourth data source comprises an off-board meteorology data transmitter.

6. The aircraft of claim 1, wherein the second comparison is performed in response to the first comparison indicating that a difference between the first speed value and the second speed value is greater than a threshold.

7. The aircraft of claim 1, wherein the situational awareness data indicates whether the first speed value, the second speed value, or both, is reliable.

8. The aircraft of claim 1, wherein the sensor reliability data indicates that the first speed value is more reliable than the second speed value when:
    the first comparison indicates that the first speed value differs from the second speed value by greater than a first threshold;
    the second comparison indicates that the first likelihood of icing value differs from the second likelihood of icing value by less than a second threshold; and
    at least one of the first likelihood of icing value or the second likelihood of icing value is less than a third threshold.

9. The aircraft of claim 1, wherein the first speed value and the second speed value indicate lateral speed.

10. The aircraft of claim 9, wherein the controller is further configured to:
    determine, for the first time, a first vertical speed value based on a fifth signal from a fifth data source;
    determine, for the first time, a second vertical speed value based on a sixth signal from a sixth data source; and
    perform a third comparison between the first vertical speed value and the second vertical speed value, wherein the sensor reliability data is generated further based on the third comparison.

11. The aircraft of claim 10, wherein the third comparison is performed in response to a determination that the second comparison indicates that a difference between the first likelihood of icing value and the second likelihood of icing value is greater than a threshold.

12. The aircraft of claim 10, wherein the controller is configured to generate the sensor reliability data further based on:
    whether the first data source indicates a first lateral speed change based on the first speed value;

whether the second data source indicates a second lateral speed change based on the second speed value;
whether the fifth data source indicates a first vertical speed change based on the first vertical speed value; and
whether the sixth data source indicates a second vertical speed change based on the second vertical speed value.

13. A method comprising:
determining, for a first time at a controller, a first speed value based on a first signal from a first data source and a second speed value based on a second signal from a second data source;
determining, for the first time, a first likelihood of icing value based on a third signal from a third data source and a second likelihood of icing value based on a fourth signal from a fourth data source;
performing a first comparison between the first speed value and the second speed value and a second comparison between the first likelihood of icing value and the second likelihood of icing value;
generating sensor reliability data based on the first comparison and the second comparison, wherein the sensor reliability data indicates that the first speed value is more reliable than the second speed value in response to:
  the first comparison indicating that the first speed value differs from the second speed value by greater than a first threshold;
  the second comparison indicating that the first likelihood of icing value differs from the second likelihood of icing value by less than a second threshold; and
  at least one of the first likelihood of icing value or the second likelihood of icing value being less than a third threshold; and
displaying situational awareness data based on the sensor reliability data.

14. The method of claim 13, wherein the sensor reliability data indicates that the second speed value is more reliable than the first speed value when:
the first comparison indicates that the first speed value differs from the second speed value by greater than a first threshold;
the second comparison indicates that the first likelihood of icing value differs from the second likelihood of icing value by less than a second threshold; and
at least one of the first likelihood of icing value or the second likelihood of icing value is greater than a third threshold.

15. The method of claim 13, further comprising generating a maintenance alert based on the sensor reliability data indicating that one or more sensors is inaccurate or unreliable.

16. The method of claim 13, wherein the first speed value and the second speed value indicate lateral speed.

17. The method of claim 16, further comprising:
determining, for the first time, a first vertical speed value based on a fifth signal from a fifth data source;
determining, for the first time, a second vertical speed value based on a sixth signal from a sixth data source; and
performing a third comparison between the first vertical speed value and the second vertical speed value, wherein the sensor reliability data is generated further based on the third comparison.

18. The method of claim 17, wherein the third comparison is performed in response to a determination that the second comparison indicating that a difference between the first likelihood of icing value and the second likelihood of icing value is greater than a threshold.

19. A non-transitory computer-readable medium comprising instructions that, when executed by a controller of an aircraft, cause the controller to perform operations comprising:
determining, for a first time, a first speed value based on a first signal from a first data source and a second speed value based on a second signal from a second data source, wherein the first speed value and the second speed value indicate lateral speed;
determining, for the first time, a first vertical speed value based on a third signal from a third data source and a second vertical speed value based on a fourth signal from a fourth data source;
performing a first comparison between the first speed value and the second speed value and a second comparison between the first vertical speed value and the second vertical speed value;
generating sensor reliability data based on the first comparison and the second comparison; and
facilitating a display of situational awareness data based on the sensor reliability data.

20. The non-transitory computer-readable medium of claim 19, wherein the first data source comprises at least one of a pitot tube or a global positioning system receiver.

* * * * *